United States Patent [19]

Gartner et al.

[11] 4,298,467
[45] Nov. 3, 1981

[54] WATER TREATMENT SYSTEM

[75] Inventors: William J. Gartner, Bartlett; Harry R. Henke, Northbrook, both of Ill.

[73] Assignee: Panlmatic Company, Elk Grove Village, Ill.

[21] Appl. No.: 156,810

[22] Filed: Jun. 5, 1980

Related U.S. Application Data

[63] Continuation of Ser. No. 803,577, Jun. 6, 1977, abandoned.

[51] Int. Cl.³ .............................. C02F 1/50; C02F 1/78
[52] U.S. Cl. ................................. 210/96.1; 210/109; 210/192; 210/199; 210/202; 210/206; 210/218; 210/220; 210/257.1
[58] Field of Search ...................... 210/760, 765, 96.1, 210/109, 167, 192, 194, 195.1, 197, 202, 206, 207, 218, 220, 221.1, 257.1, 259, 199; 423/581; 422/24

[56] References Cited

U.S. PATENT DOCUMENTS

| | | | |
|---|---|---|---|
| 1,047,534 | 12/1912 | Joseph | 210/220 X |
| 2,660,559 | 11/1953 | Prime | 210/760 |
| 2,889,275 | 6/1959 | Moore | 210/760 X |
| 3,220,706 | 11/1965 | Valdespino | 210/221.1 X |
| 3,253,711 | 5/1966 | Young | 210/96.1 X |
| 3,326,747 | 6/1967 | Ryan et al. | 210/760 X |
| 3,336,099 | 8/1957 | Czulak et al. | 210/760 X |
| 3,692,180 | 9/1972 | LaRaus | 210/192 X |
| 3,699,776 | 10/1972 | LaRaus | 210/192 X |
| 3,779,913 | 12/1973 | Martin | 210/220 X |
| 3,915,857 | 10/1975 | Olson | 210/275 X |

FOREIGN PATENT DOCUMENTS

| | | | |
|---|---|---|---|
| 572766 | 3/1933 | Fed. Rep. of Germany | 210/192 |
| 50-94757 | 7/1975 | Japan | 210/760 |
| 79180 | 10/1918 | Switzerland | 210/192 |

Primary Examiner—Robert H. Spitzer
Attorney, Agent, or Firm—Robert E. Wagner; Ralph R. Rath

[57] ABSTRACT

A batch water treatment system is provided in which ozone is the reactive agent. The system includes a holding tank containing untreated water in communication with a reaction tank in which ozone is dispersed under pressure through a plurality of foraminous diffusers which are connected to a modular ozone generator. Impurities contained in the water are oxidized or broken down by the ozone into forms capable of filtration, and as this treatment process progresses the water is circulated through a conduit to a monitor which measures the level of impurities in the water. Once a predetermined proportion of impurities are broken down and filtered from the system, the monitor automatically activates a drain line to evacuate the reaction tank of the treated water and then refills it with more untreated water from the holding tank to repeat the process.

7 Claims, 6 Drawing Figures

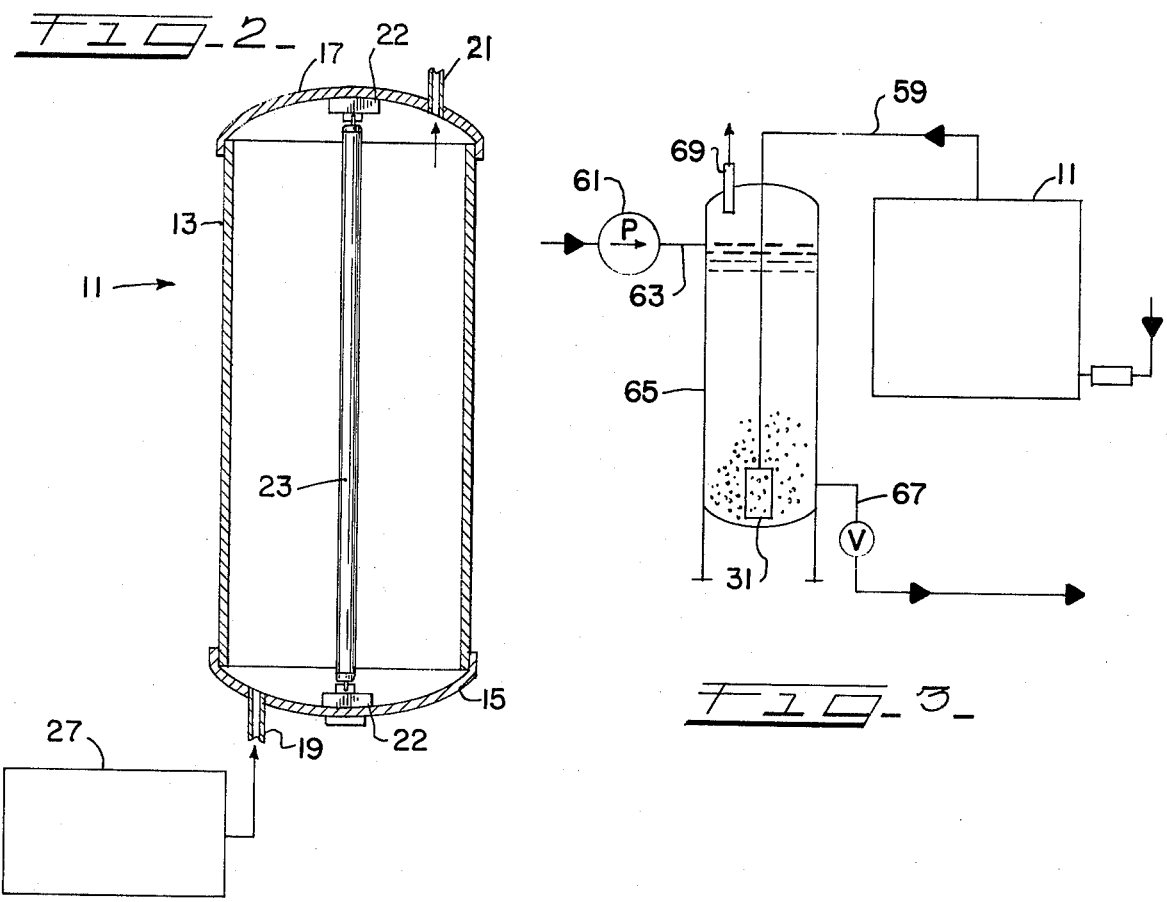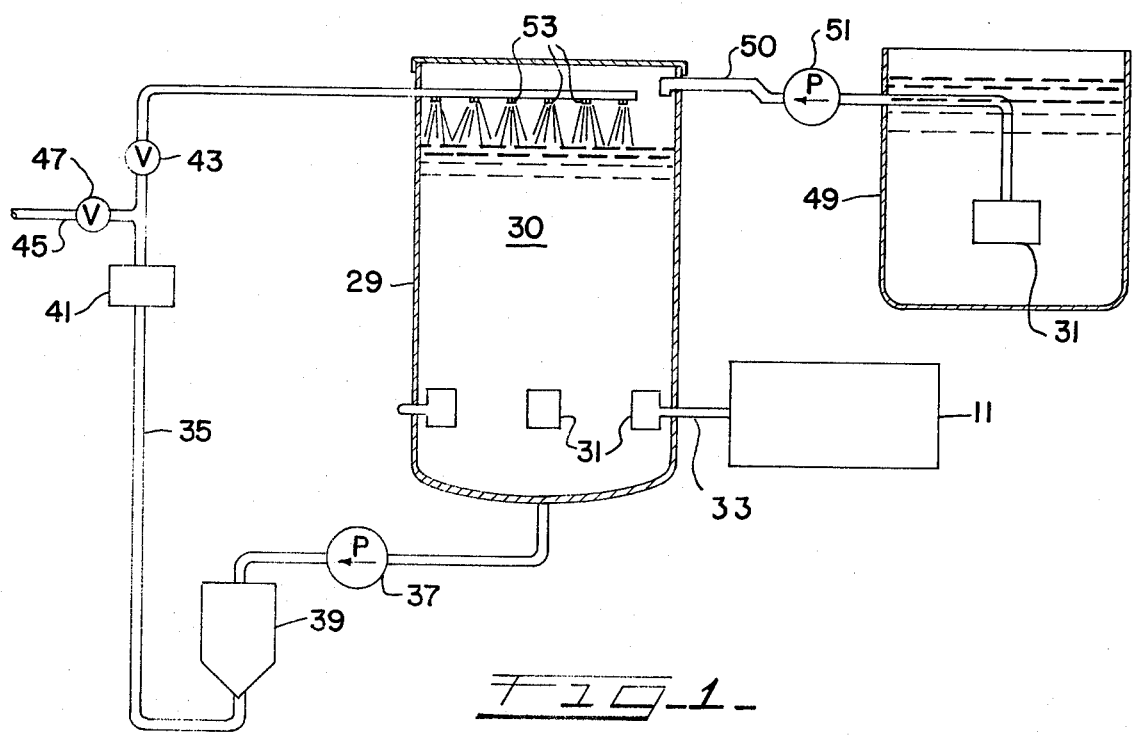

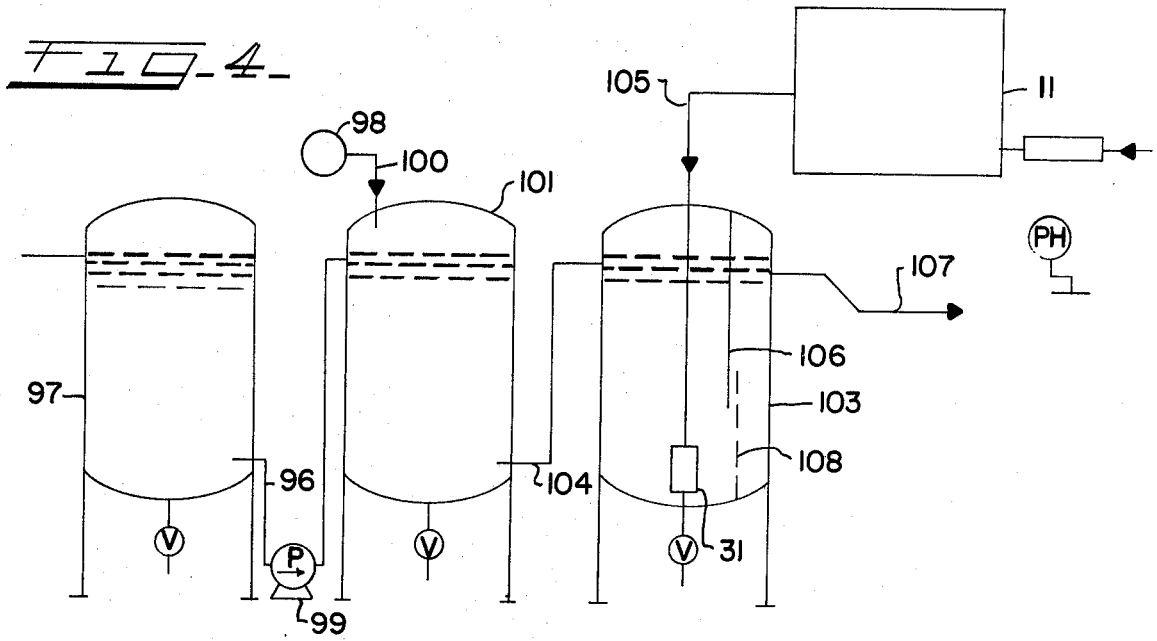
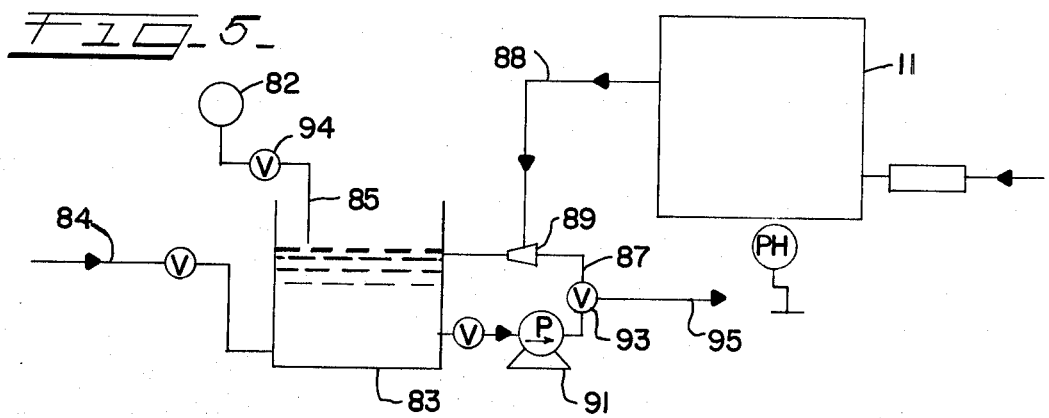
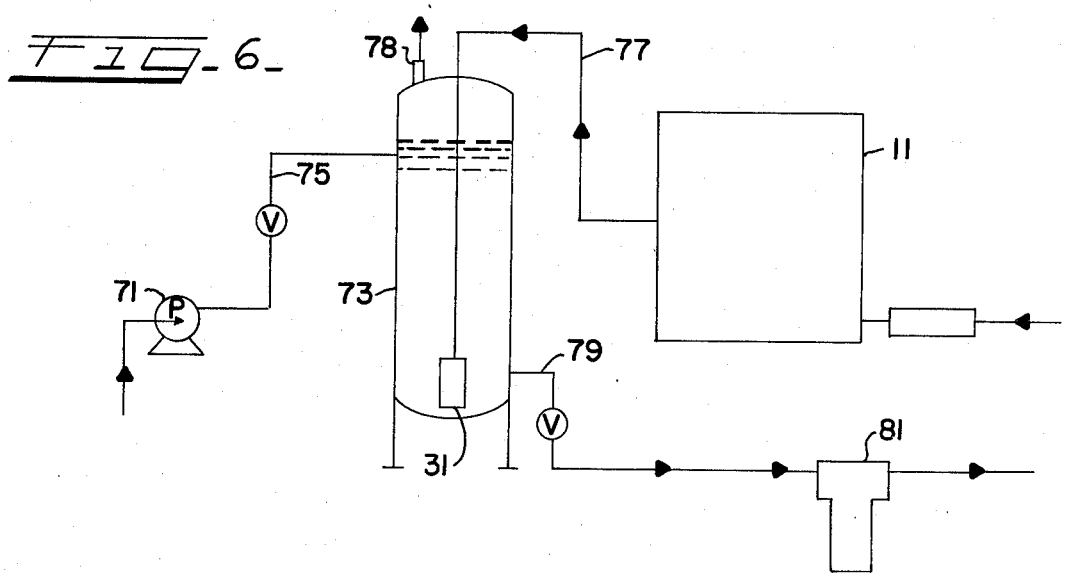

WATER TREATMENT SYSTEM

This application is a continuation of application Ser. No. 803,577, filed June 6, 1977, now abandoned.

BACKGROUND OF THE INVENTION

The quantity and variety of pollutants introduced into our lakes, rivers and streams from domestic and industrial sources has increased at an alarming rate in recent years. Pollutants ranging from organic wastes to toxic chemicals have been found in surface waters at levels far in excess of the water's natural capability to oxidize them. In an effort to improve water quality, domestic and industrial polluters have been required to develop treatment systems capable of removing a substantial amount of the organic and inorganic wastes from the water they utilize, prior to its return to surface water sources.

Several prior art systems have been developed for the treatment of water contaminated with organic wastes, cyanides, phenolic compunds, heavy metals and the like. The term "water" as used herein is intended to include any water containing undesirable contaminants or impurities, including but not limited to, the above named impurities. A typical treatment system employed chlorine gas as the reactive agent. However, chlorine was found to have limited oxidizing and bond cleavage capabilities and proved to be difficult to use effectively in purifying the water. Systems using chlorine gas generally consist of several holding tanks, the pH of the water in each tank being carefully monitored and controlled within specific ranges throughout the treatment process. As the water to be treated is introduced into the first holding tank, the pH of the water is raised to about 12 and transferred to the second tank where a suitable flocculent is introduced, causing the metal ions produced by reaction with the chlorine gas to settle out of the solution for later removal by a filter. In a third tank, the pH is lowered to a range of 6 to 9.

The apparatus for this cumbersome treatment process is expensive to construct, and the operational costs are substantial as constant monitoring of the pH levels is required during operation. In addition, the bond cleavage capability of chlorine gas is limited. For example, chlorine gas will not react to break down the carbon-nitrogen bond found in cyanide molecules, such as sodium or copper cyanide, and these chemicals are very difficult to remove from water by filtration.

The superior bacteriocidal, viricidal, oxidizing and bond cleavage capabilities of ozone have been known for many years. However, the major factor preventing the widespread use of ozone in water treatment systems in this country, as an alternative to chlorine gas, is the prohibitive costs of purchasing, operating and maintaining existing types of ozone generators. Prior art ozone generators produce ozone primarily by electrostatic corona. Two or more discharging surfaces, which form a condenser with an air gap, are disposed at a distance from one another and may or may not be furnished with a dielectric element. A certain electrostatic flux density will cause pale violet light to appear adjacent the conductive surfaces. If the air between the conductive surfaces is adequately dehumidified, and proper levels of voltage and frequency are obtained, the discharge of electricity between the surfaces will be substantially silent, with very little discharge of sparks, and a high proportion of the generated light will consist of ultraviolet rays. This silent discharge or electrostatic corona produces ozone in a relatively highly charged state.

The efficiency of ozone production by electrostatic corona is dependent upon the shape of the surfaces of the electrode, the dielectric pressure, and the humidity of the air between the conductive surfaces. For optimum production of ozone a device for dehumidification is required, which adds substantially to the operating costs of conventional generators. Existing ozone generators are also expensive to purchase, requiring a sizeable initial capital investment. In addition, conventional generators produce oxides of nitrogen, which combine with water vapor in the ambient air to form corrosive nitric acid. Maintenance costs are thus relatively high as parts of the generators corroded by nitric acid may require repair or replacement.

SUMMARY OF THE INVENTION

Accordingly, the present invention provides a continuous flow, batch treatment system for the removal of organic and inorganic wastes from water, including a unique modular ozone generator which produces ozone having oxidizing and bond cleavage capabilities superior to that of high voltage ozone produced by conventional generators. Complex phenols, cyanides, heavy metals, bacteria, and the like contained in water are removed or reduced to harmless forms after treatment by the present invention.

The system consists of a holding tank which supplies water to be treated to a reaction tank. The ozone produced by the modular ozone generator, discussed in detail below, is introduced into the reaction tank through diffusion means disposed about the circumference of the reaction tank at its base. The water is circulated through a conduit attaching at opposite ends to the top and bottom of the reaction tank. Metal oxides and other precipitants produced by reaction with the ozone are filtered out of the water by a filter disposed within the conduit. The water is circulated through the system until the impurities are broken down to harmless forms or filtered out. At that time, a monitor opens a drain line to remove the treated water from the reaction tank and then activates an infeed pump which fills the reaction tank with more water as soon as the treated water is completely drained. The circulation process and ozone treatment is then replaced for the new batch of water.

The present system thus creates impurities contained in water without the necessity for pH adjustment or the addition of flocculents. Complex compunds are broken up entirely or reduced to harmless forms capable of filtration. The entire treatment process is accomplished in a closed system, which automatically drains the treated water and refills itself with a new batch of water for treatment.

The modular ozone generator of the present invention produces ozone by disassociation of oxygen molecules in an ambient air stream using a commercially available ultraviolet light source. The generating device is comprised of an elongated hollow vessel formed of metal or plastic, which is sealed at both ends with caps. One cap is formed with an inlet conduit of the other an outlet conduit to permit the ingress of an air stream and the egress of an ozone-air mixture. Disposed within the vessel is an ultraviolet light source which produces a certain percentage of its output in the range of 149 nanometers, which is the disassociation spectrum of the oxygen molecule. As the air stream is passed over the ultraviolet light source, a unique ozone molecule is produced having a neutral charge or a slightly positive polarity, as opposed to the highly negatively charged ozone produced by conventional high voltage electric discharge systems. The amount and concentration of ozone produced is a function of the air pressure within the vessel, the diameter of the vessel and the air flow volume through the vessel.

In view of the deficiencies and limitations of existing water treatment systems, it is an object of the present invention to provide a continuous batch treatment system for the removal of organic and inorganic wastes from water which includes a modular ozone generator.

It is a further object of this invention to provide a fully automatic waste removal system for water which monitors the level of impurities, releases the treated water when fully cleaned, and then subsequently supplies itself with another batch of contaminated water for treatment.

It is another object of the present invention to provide a modular ozone generator which produces ozone by disassociation of the oxygen molecule.

It is a still further object of the present invention to provide a modular ozone generator which produces a molecule of ozone which is generally neutral in charge or with a slight positive charge, having significantly improved bond cleavage and oxidation properties, as compared with the high voltage ozone produced by prior art conventional generators.

Further objects of the present invention will become apparent through consideration of the following description taken in conjunction with the drawings, wherein:

DESCRIPTION OF THE DRAWINGS

FIG. 1 is an over-all schematic view of the continuous batch treatment system of the present invention including the modular ozone generator;

FIG. 2 is a cross-sectional view of the modular ozone generator, having a standard compressor means for providing an air flow through the vessel;

FIG. 3 is an over-all schematic view of a treatment system employing the ozone generator of the present invention, specifically adapted for the treatment of water in flow-through systems such as that of a conventional low velocity swimming pool system;

FIG. 4 is an over-all schematic view of a continuous treatment system for removal of phenols, cyanides and heavy metals, which also employs the ozone produced by the generator of the subject invention;

FIG. 5 is an over-all schematic view of a batch treatment system for the removal of cyanides, phenols and heavy metals, which employs the ozone produced by the generator of the subject invention; and, FIG. 6 is an over-all schematic view of a well-water treatment system using the ozone generator of the present invention for the removal of sulfides, iron and manganese.

DESCRIPTION OF THE INVENTION

Referring now to FIG. 1, a continuous batch treatment system is shown for the removal of cyanides, phenols, heavy metals, bacteria, viruses and the like from water. The system is equipped with a modular ozone generator 11, discussed in detail below, which eliminates the need for pH control of the water during the treatment process and enables the system to be compact in construction as compared to existing systems using chlorine gas. Generally, the system consists of a first tank containing untreated water in communication with a second tank. The untreated water is pumped into the second tank where ozone is introduced, for treatment of the impurities contained in the water. The water is circulated through a conduit connected to the second tank until the impurities are filtered out or broken down, whereupon the now treated water is drained, and more untreated water from the first tank is pumped into the second tank for treatment.

More specifically, the system includes a reaction tank 29 closed at the top and partially filled with the water 30 to be treated. A conduit 35 is connected to the bottom of reaction tank 29 at one end, and at the other end to the upper portion of the reaction tank 29 at a point above the level of water 30 within the reaction tank 29. Ozone produced by the ozone generator 11, is introduced into the reaction tank 29 through an ozone line 33 connected to at least four foraminous or microporous diffusers 31 disposed about the circumference of the reaction tank 29 near its base. The critical treatment process is accomplished in the reaction tank 29, as the ozone is bubbled throughout the water 30 in quantities sufficient to break-up the chemical bonds of unwanted impurities or oxidize them to form precipitants capable of filtration.

The water 30 is continually pumped through conduit 35 by pump 37 for more complete circulation and dispersion of ozone throughout the water 30. Precipitants formed by the ozone during the treatment process are filtered out of the water 30 by a filter 39 which is connected to conduit 35. A monitor 41, in communication with conduit 35, measures the level of impurities within the water 30 as the treatment process progresses. A drain line 45 having an outlet valve 47 disposed therealong, is connected to conduit 35 adjacent the monitor 41 to provide an outlet for the water 30 when treatment is completed. A line valve 43 is placed in conduit 35 to control the flow of water 30 therethrough.

The operation of valves 43 and 47 is controlled by the monitor 41. During the treatment process, the monitor 41 closes outlet valve 47 and opens line valve 43 to allow the water 30 to circulate through conduit 35 and return to the reaction tank 29 for further treatment. When a predetermined proportion of impurities has been removed from the water 30 through reaction with the ozone and filtration by the filter 39, the monitor 41 will automatically close line valve 43 and open outlet valve 47 to allow the treated water to escape into drain line 45. A holding tank 49, containing untreated water, is connected to the reaction tank 29 by an inlet conduit 50. When the reaction tank is completely drained of treated water, an inlet pump 51 is activated by the monitor 41 to fill the reaction tank 29 with untreated water from holding tank 49. The outlet valve 47 is closed and line valve 43 is opened simultaneously with the activation of inlet pump 51, and the treatment process is then repeated.

A series of nozzles 53 attached to conduit 35 at the top of the reaction tank 29 are provided to reduce foaming at the surface of the water 30, and also to recapture ozone which escapes from the water 30 within the reaction tank 29. The ozone which is not recaptured by nozzles 53 passes through inlet conduit 50 and into a diffuser 31 for preliminary treatment of the water 30 in holding tank 49. Thus, very little ozone is wasted by this system, and its bacteriocidal, viricidal and oxidizing capabilities are used efficiently.

Referring now to FIG. 2, the single module ozone generator of the present invention is depicted generally by reference 11. The generator 11 is comprised of an elongated hollow vessel 13 open at both ends, which can be made of a metal or plastic. The vessel 13 is sealed at each end by caps 15 and 17 formed with conduits 19 and 21, respectively, which extend into the interior of vessel 13.

Disposed in the center of vessel 13 is a commercially available ultraviolet light source 23, powered by a standard fluorescent lamp ballast, which contacts electrical connections 22 mounted to end caps 15 and 17. The ultraviolet light source 23 used in the embodiment of FIG. 1 is a commercially available Model G376T6VH lamp, or a suitable equivalent. This lamp, in comparison to standard ultraviolet lamps, has a higher percentage of its output in the 149 nanometer range, which is the wavelength at which oxygen is disassociated into atomic oxygen, making it possible to form ozone. The glass used in the manufacture of this lamp is a high quality silica quartz which permits the passage of a higher quantity of the 149 nanometer wavelength ultraviolet light than other available glasses.

In the embodiment of FIG. 1, compressor 27 forces an air stream, under pressure, through vessel 13 from conduit 19 to conduit 21. As the air stream passes over the ultraviolet light source 23, oxygen molecules are disassociated into atomic oxygen which, as is well known, combines with oxygen molecules to form ozone. An alternative embodiment may be provided, wherein a vacuum means (not shown) is applied to the conduit 21, creating a negative pressure at the conduit 19 to draw an ambient air stream through vessel 13.

The exact atomic configuration of the ozone molecule produced by generator 11 is unknown and different theories have been posited which may explain why this ozone molecule has a neutral or slightly positive charge as compared to the highly negatively charged ozone molecules produced by conventional high voltage generators. It is believed that the ozone produced by generator 11 may have an atomic configuration of $O_5$ or $O_6$ instead of $O_3$ which is the most common form of ozone. It has recently been discovered, that the product of generator 11 is a mixture of ozone and nitrogen gas in which nascent atomic oxygen is formed having a substantially neutral charge.

In any event, it has been found that this neutral or slightly positive ozone molecule possesses unique chemical properties and substantial oxidizing and bond cleavage capabilities. The ozone produced by generator 11 has proven to be an extremely reactive and aggressive form of ozone, which is much more powerful and efficient in the treatment of water than the negatively charged ozone produced by conventional high voltage generators.

The bond cleavage capability of high voltage ozone is limited. For example, high voltage ozone will simply oxidize complex cyanide compounds to form the cyanate. The neutral or slightly positive ozone formed by generator 11, however, has the bond cleavage capability to break the carbon-nitrogen bond in cyanide compounds. The metal ions produced from the reaction of these cyanide compounds with the ozone formed by generator 11 are then oxidized to form a metal oxide or the lowest stable salt, which may be readily removed from water by filtration. High voltage ozone generally reacts with metal ions to form the metal hydroxide which is difficult to reclaim or filter. The exceptional bond cleavage capability of ozone formed by generator 11 has also been observed in the treatment of water containing various phenolic compounds including chlorinated phenols and polychlorinated biphenyls.

Of course, properties attributable to conventionally produced ozone, such as the removal of organic wastes, odors, and tastes from water are accomplished by the ozone formed by generator 11. However, because of the highly reactive nature of this ozone, concentrations may be used which are 10 to 20 times less than would be required using high voltage ozone, while maintaining the same degree of treatment effectiveness. This is important in that low concentration ozone in the range of 1000 ppm for example, is much less hazardous to handle than the high concentration ozone in the range of 10,000 ppm to 20,000 ppm of conventional generators. In addition, high concentration ozone tends to produce ozone bearing off gases from treatment due to poor absorption in the water which is not true of the ozone produced by generator 11.

It has been found that the ultraviolvet disassociation of oxygen to form ozone within vessel 13 produces no oxides of nitrogen. This is significant in that oxides of nitrogen, formed by conventional ozone generators, will form nitric acid which causes substantial corrosion and maintenance problems in existing types of generators.

The generator 11 is designed to produce maximum concentrations of ozone in the air/ozone stream leaving vessel 13, while maintaining the neutral or slightly positive charge on the ozone. The output characteristics of generator 11, having a single module, are dependent on the diameter of the vessel 13, the flow rate of the ambient air stream through the vessel 13, and the pressure developed within the vessel 13. Ozone production is obtained from the generator 11 using a vessel 13 having an outside diameter of from 2 to 6 inches in a pressure range within the vessel of from 1 to 25 psi and at a flow rate of ambient air through the vessel of from 0.1 to 10 cubic feet per minute. It has been found, using the standard 36" ultraviolet light source 23, as depicted in FIG. 1, that the maximum concentration of ozone is produced in a pressure range of between 5 to 10 psi, at a flow rate of between 0.5 and 2.0 cubic feet per minute, within a vessel 13 having an outside diameter of 4 to 6 inches. The above-identified values are optimum conditions for the production of the highest concentrations of neutral or slightly positive ozone and changes in the vessel diameter or flow rate or vessel pressure, outside of the optimum ranges depicted above, will create a marked reduction in the ozone concentration. Such changes may be desirable however, to alter the output concentration of generator 11 to achieve a particular concentration for a given application.

In addition, large quantities and higher concentrations of ozone can be produced by combining any number of individual modules to form a combination generator having a plurality of vessels 13. Thus an efficient means of forming a highly reactive molecule of ozone is provided which is constructed in modular units which may be combined as desired to produce enough ozone for a variety of applications.

The advantages of generator 11 over prior art ozone generators are numerous. As discussed briefly above, the primary reason preventing widespread use of ozone in water treatment systems is the prohibitive capital and operating costs of existing ozone generators. Conventional high voltage ozone generators require dehumidification of the air between the discharge plates to avoid shorting of the system. Since the present invention does not utilize high voltage, the air entering vessel 13 need only be filtered by a simple dust filter or an equivalent to remove particulate matter. No dehumidification of the air stream is required. Accordingly, the power consumption required by the dehumidification system is totally eliminated, creating considerable savings. In addition to the savings realized in reduced operating costs, the modular ozone generator is compact and represents a much smaller initial capital expenditure per pound of ozone generated than conventional high voltage generators. Since the ozone formed by generator 11 is a much more reactive form of ozone than the high voltage oxone produced by conventional generators, much less ozone need be added to water by generator 11 than would be required using a conventional generator for the same treatment efficiency. In addition, the modular form of generator 11 enables the production of large quantities and high concentrations of ozone by simply combining individual modules. Increased ozone production from conventional generators is accomplished only by increasing their already bulky and cumbersome size. As a result, the capital cost of producing relatively large quantities of ozone using generator 11 is a fraction of that required for high voltage generators producing the same amount of less-reactive ozone.

The generator 11 has been utilized in conjunction with various existing water treatment systems designed to remove different types of impurities, with significant improvements being realized in the effectiveness and efficiency of each system.

Referring now to FIG. 3, the generator 11 is adapted for use in a flow-through system for the purification of swimming pool water. The use of ozone produced by the generator 11 is a far more economical and efficient means of cleaning pool water than the conventional chlorine treatment now most widely used. Since ozone is a far more powerful oxidizing agent than chlorine, the cost of using ozone is a fraction of that for chlorine. Chlorine is only ideally effective in a limited pH range of approximately 7.2 to 7.6. Thus, constant monitoring of the pH level and chemical treatment for pH control is required. Ozone, however, is effective over the wide pH range of 6 to 10, and has the capacity to maintain the pH level of the pool water in a neutral condition from either an acidic or alkaline state. Accordingly, pH control is normally not required in swimming pools where ozone is used as the treatment agent. Chlorine is effective in destroying algae only at chlorination levels above 10 parts per million. This extremely high level would be intolerable for swimming, and would require closing the pool if utilized. Ozone kills algae by bio-oxidation at its normal residual level, and also facilitates filtration of algae from the water, thus eliminating "green water" problems.

All swimming pools tend to accumulate a scum line from body and hair oils. Chlorination will not reduce or control the scum line, and routine scrubbing of the entire pool perimeter is required. Body oils that accumulate in water are oxidized by ozone and may be subsequently removed by a filter. A frequent complaint of swimmers using chlorine-treated pools is that the pool water has a pungent odor and causes eye irritation after relatively short periods of use. There is rarely any noticeable odor from the use of ozone and it does not irritate the eyes. Due to its extremely powerful oxidizing characteristics, the ozone generated from the generator 11 reduced the surface tension of pool water to an extent where it may be readily noticeable to swimmers. Water containing sulfides, iron, manganese and the like, is purified as these ions are oxidized and filtered out of the water.

Referring now to FIG. 3, the swimming pool treatment system utilizing the generator 11 is depicted in schematic form. Water is withdrawn from the pool through a conventional filter pump 61. The filtered water flows through conduit 63 into a treatment tank 65. Ozone produced by generator 11 is introduced into treatment tank 65 through ozone line 59. The untreated water in tank 65 is exposed to the ozone through a microporous or foraminous diffuser 31 which bubbles the ozone throughout the tank 65. Any waste or excess gases produced during the treatment process within tank 65 are released through a vent 69 at the top of tank 65. The treated water is then withdrawn from tank 65 through an inlet conduit 67 which connects to existing pool inlets.

The ozone generator 11 also has application in a system for the purification of well water for drinking purposes. Much of the existing ground water used from a well contains sulfides, iron, manganese, bacteria, viruses and the like. Water containing these contaminants often has a pungent odor and an offensive metallic taste. Existing methods of treatment of this so-called "foul water" are expensive and relatively inefficient.

Referring now to FIG. 6, a drinking water treatment system is depicted using the ozone produced by the generator 11. Ground water is removed by an existing pump 71 and flows to a treatment tank 73 through inlet conduit 75. The ozone produced by generator 11 is introduced into the treatment tank 73, under pressure, through ozone line 77. A microporous or foraminous diffuser 31, disposed near the bottom of treatment tank 73, is connected to ozone line 77 and bubbles the ozone throughout the untreated water. The ozone from generator 11 reacts with compounds of sulfur, iron and manganese contained in the untreated water to form ions, which are generally oxidized to form the oxide or lowest stable salt. Any waste gases produced by the treatment process are released through vent 78 at the top of treatment tank 73. The treated water is removed from tank 73 through an outlet conduit 79.

The metal oxides or salts formed in tank 73 by reaction with the ozone are removed from the treated water by a multi-layer filter 81 which is in communication with outlet conduit 79 thus producing drinking water which is free of the smell and taste of normal well water. The filter 81 is preferably in the form of a disposable cartridge which may be easily removed from the system and quickly replaced. A 5 micron multi-layered filter has been found to be suitable for removing the bulk of the oxides and salts produced during treatment.

FIGS. 4 and 5 depict alternative embodiments for the treatment of water containing such impurities as phenols, cyanides, and heavy metals. The system of FIG. 4 is a continuous flow treatment system having several tanks in communication with one another. Water is constantly circulated through the tanks, and in each tank a separate step of the treatment process is accomplished. The treatment system of FIG. 5 is a batch system which removes unwanted impurities from a given quantity of water, which is then drained from the system before more water to be treated is introduced.

Referring now to FIG. 4, the continuous flow treatment system is shown. Water effluent is introduced into a vented flow control tank 97 by an existing pump (not shown). A constant flow pump 99 pumps the water from tan 97 through conduit 96 into a reaction tank 101 at a rate equivalent to the input flow. A dispenser 98 injects material having a high alkaline content through conduit 100 into the water within reaction tank 101 at a rate corresponding to the input flow of water, to raise the pH within the tank 101 to between 10 and 12. This highly alkaline water from the reaction tank 101 is then directed into a treatment tank 103 through conduit 104. Ozone produced by generator 11 is introduced into the treatment tank 103 through ozone line 105 and is dispersed throughout the water by a microporous or foraminous diffuser 31. Baffle plates 106 and 108 are connected at the top and bottom of tank 103 to provide a surface for metal ions and oxides produced by the ozone during the treatment process to attach or settle out of the water. The treated water is discharged from tank 103 through a conduit 107, and flows to a settling tank or a filtration system (not shown) for the removal of any remaining impurities which did not settle out in tank 103 and for the addition of acidic material to lower the pH of the water to a range of from 6 to 8.

Referring now to FIG. 5, the alternative batch treatment system for water containing phenols, cyanides and heavy metals is shown. An existing pump (not shown) introduces water effluent into treatment tank 83 through an inlet conduit 84. A dispenser 82, containing material having a high alkaline content is connected to tank 83 by conduit 85. This alkaline material is injected into treatment tank 83 by opening valve 94 in conduit 85, to increase the pH of the water to a range of between 10 and 11.

A second conduit 87 is connected at one end near the top of tank 83 and at the other end near its base. A pump 91 disposed along circulation conduit 87 continually circulates the water through tank 83 from bottom to top. A venturi inductor 89 connected to ozone generator 11 by ozone line 88, is placed in communication with circulation conduit 87 and the water circulating therethrough. A vacuum means (not shown) applies a vacuum at the venturi inductor 89 to draw the ozone produced by generator 11, into the flow of the water as it passes through the venturi inductor 89 to disperse the ozone into the water as completely as possible. The ozone—saturated water then proceeds into the reaction tank 83 for treatment.

The water is circulated through circulation conduit 87, and exposed to additional quantities of ozone until the impurities contained in the water are broken down to harmless forms capable of being filtered or settled out of the solution. At that time, the now treated water is removed from the system by opening outlet valve 93 in drain line 95 which is connected to the circulation conduit 87. The treated water may then be directed to a settling tank or a filter means (not shown) where the pH is lowered to a range of from 6 to 8 by the addition of acidic material, and the remaining impurities are settled or filtered out of the water. When tank 83 is completely drained, valve 93 is closed and a new batch of water to be treated is introduced into tank 83 to repeat the treatment process.

Accordingly, several systems have been described hereinabove in which ozone produced by generator 11 may be used to treat a variety of impurities found in water. The unique properties of the ozone make batch systems and continuous treatment systems efficient and economically feasible. The various treatment systems depicted herein are exemplary of the wide range of applications in which ozone produced by generator 11 may be used.

Upon a consideration of the foregoing, it will become obvious to those skilled in the art that various modifications may be made without departing from the invention embodied herein. Therefore, only such limitations should be imposed as are indicated by the spirit and scope of the appended claims.

We claim:

1. A continuous system for the treatment of water effluent containing such impurities as phenols, cyanides and heavy metals, said system comprising:

a vented flow control tank containing said water;

a supply conduit connecting said flow control tank to an existing source of said water;

a vented reaction tank in communication with said flow control tank containing said water, said reaction tank having a first dispenser means adapted therewith containing alkaline material, said alkaline material being added to said water to increase the pH of said water to a range of from 10 to 12;

a constant flow pump disposed within said system for continuous circulation of said water therethrough;

a vented treatment tank communicating with said reaction tank formed with upper and lower baffle plates;

ozone generating means;

diffusion means mounted near the base of said treatment tank;

an ozone line connecting said ozone generating means with said diffusion means for the dispersion of ozone throughout said water in said treatment tank for the treatment of said impurities by said ozone, said treatment of said impurities producing reacted end products including metal ions and oxides, said reacted end products being partially removed from said water by contacting said baffle plates within said treatment tank;

outlet means connected to said treatment tank for continuous flow of said water therefrom;

means communicating with said outlet means for the removal of said reacted end products remaining in said water; and, second dispenser means connected to said outlet means containing acidic material having a low pH, said acidic material being added to said water to lower the pH to a range of from 6 to 8, whereby reaction of said impurities with said ozone and removal of said reacted end products produces treated water substantially free of said impurities.

2. The system of claim 1 wherein said means for the removal of said reacted end products is a settling tank connected to said outlet means, said reacted end products being settled out of said treated water in said settling tank whereby the water removed from said settling tank is substantially free of said impurities and reacted end products.

3. The system of claim 1 wherein said means for the removal of said reacted end products is a filter means connected to said outlet means, whereby said reacted end products are filtered from said treated water to form water substantially free of said impurities and reacted end products.

4. The system of claim 1 wherein said ozone generating means comprises an elongated hollow closed vessel, said vessel being formed with inlet and outlet means, an ultraviolet light source disposed within said vessel, and circulation means adapted with said vessel to create a flow of ambient air under pressure through said vessel between said inlet and outlet means, whereby as said ambient air is exposed to said ultraviolet light source ozone molecules having a substantially neutral charge are produced by disassociation of the oxygen molecule for treatment of said impurities contained in said water.

5. A batch water treatment system for the removal of impurities from water to form treated water comprising:

a reaction tank;

a supply tank containing water to be treated;

a supply conduit connecting said supply tank with said reaction tank;

first pump means disposed along said supply conduit for pumping said water to be treated from said supply tank to said reaction tank for treatment;

first diffusion means disposed about the circumference of said reaction tank near the bottom;

ozone generating means communicating with said first diffusion means for bubbling ozone throughout said water in said reaction tank for treatment of said impurities contained in said water producing reacted end products of said impurities;

a circulation conduit connecting at one end near the bottom of said raction tank and extending at the other end into the interior of said reaction tank near the top for continuous circulation of said water through said reaction tank during the treatment of said impurities in said water, said circulation conduit including second diffusion means disposed within said reaction tank for reducing foaming at the surface of said water and to recapture excess ozone during said treatment;

third diffusion means disposed along said supply conduit within said supply tank, said supply conduit capturing excess ozone escaping from the water within said reaction tank and conveying said ozone to said third diffusion means within said supply tank for preliminary treatment of said water;

filter means connected along said circulation conduit for the removal of said reacted end products of said impurities from said water forming treated water;

drain means connected to said circulation conduit for removal of said treated water from said system once said impurities are removed;

monitoring means communicating with said circulation conduit for detecting the level of impurities in said water as said treatment progresses, said monitoring means activating said drain means when said impurities are removed to completely drain said treated water from said reaction tank, whereupon said monitoring means activates said first pump means to transfer water to be treated from said supply tank to said reaction tank for treatment, said monitoring means closing said drain means and deactivating said first pump means when said reaction tank fills to repeat said treatment process.

6. The batch water treatment system of claim 5 wherein said ozone generating means includes an elongated hollow closed vessel having a geometric axis and a diameter in the range of between four and six inches, said vessel being formed with an inlet means and outlet means, an ultraviolet lamp of high quality silica quartz producing and emitting a high percentage of output within the disassociation wavelength of oxygen, said ultraviolet lamp being generally cylindrical in cross section and disposed generally on the geometric axis of said closed vessel, and circulation means associated with said vessel to create a flow of ambient air through said vessel at a rate in the range of five-tenths to two cubic feet per minute, said circulation means creating a pressure within said vessel in the range of from five to ten pounds per square inch, whereby exposure of said air at said flow rate and said pressure to said ultraviolet lamp results in optimum production of highly reactive ozone molecules by disassociation of the oxygen molecule.

7. A batch system for the treatment of water containing such impurities as phenols, cyanides and heavy metals, said system comprising:

a treatment tank;

inlet means for filling said tank with said water to be treated;

first dispenser means connected to said tank containing alkaline material having a high pH, said alkaline material being injected into said tank by said dispenser means to raise the pH of said water to a range of from 10 to 11;

a circulation conduit connected at one end to the bottom of said tank and at the other end to the top of said tank;

a pump disposed along said circulation conduit for circulating said water therethrough;

an ozone generating means for the production of highly reactive ozone, including an elongated hollow closed vessel having a geometric axis and a diameter in the range of between four and six inches, said vessel being formed with an inlet means and outlet means, an ultraviolet lamp of high quality silica quartz producing and emitting a high percentage of output within the disassociation wavelength of oxygen, said ultraviolet lamp being generally cylindrical in cross section and disposed generally on the geometric axis of said closed vessel, and circulation means associated with said vessel to create a flow of ambient air through said vessel at a rate in the range of five-tenths to two cubic feet per minute, said circulation means creating a pressure within said vessel in the range of from five to ten pounds per square inch, whereby exposure of said air at said flow rate and said pressure to said ultraviolet lamp results in optimum production of highly reactive ozone molecules by disassociation of the oxygen molecule;

dispersion means connected to said ozone generating means, said dispersion means being in communication with said circulation conduit, said highly reactive ozone produced by said ozone generating means being introduced under pressure into said water through said dispersion means as said water is pumped through said circulation conduit, said water containing said highly reactive ozone being returned to said tank for treatment of said impurities and then recirculated through said circulation conduit for renewed exposure to said highly reactive ozone, said treatment of said impurities producing reacted end products including metal ions and oxides;

outlet means for draining said water from said tank upon completion of said treatment, said tank being filled with new water to be treated when said tank is drained of treated water;

means communicating with said outlet means for the removal of said reacted end products contained in said water after treatment by said highly reactive ozone; and, second dispenser means connected to said outlet means containing acidic material having a low pH, said acidic material being added to said water to lower the pH to a range of from 6 to 8, whereby reaction of said impurities with said highly reactive ozone and removal of said reacted end products produces treated water substantially free of said impurities.

* * * * *